United States Patent
Biron et al.

(10) Patent No.: US 11,675,412 B2
(45) Date of Patent: Jun. 13, 2023

(54) ATTENTION DETECTION SERVICE

(71) Applicant: Apple Inc., Cupertino, CA (US)

(72) Inventors: Benjamin Biron, Saratoga, CA (US); Ronnie G. Misra, San Jose, CA (US); Christopher K. Thomas, Sunnyvale, CA (US); Weijie Zhang, Santa Clara, CA (US); Roberto G. Yepez, San Jose, CA (US); Anthony J. Guetta, San Carlos, CA (US); Kelsey Y. Ho, Los Altos, CA (US); Paul W. Chinn, San Jose, CA (US); Myra Haggerty, San Mateo, CA (US); Curtis Rothert, Morgan Hill, CA (US); Peter D. Anton, San Francisco, CA (US); Jonathan E. Drummond, Campbell, CA (US); Andrew B. Cato, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/377,843

(22) Filed: Jul. 16, 2021

(65) Prior Publication Data

US 2021/0341986 A1 Nov. 4, 2021

Related U.S. Application Data

(63) Continuation of application No. 16/835,520, filed on Mar. 31, 2020, now Pat. No. 11,106,265, which is a
(Continued)

(51) Int. Cl.
*G06F 1/3231* (2019.01)
*G06F 1/324* (2019.01)
(Continued)

(52) U.S. Cl.
CPC ............ *G06F 1/3231* (2013.01); *G06F 1/324* (2013.01); *G06F 1/3265* (2013.01);
(Continued)

(58) Field of Classification Search
CPC ...... G06F 1/3231; G06F 1/324; G06F 1/3265; G06F 1/3287; G06F 1/3296; Y02D 10/00
See application file for complete search history.

(56) References Cited

U.S. PATENT DOCUMENTS

| 8,639,291 | B1 | 1/2014 | Gailloux et al. |
| 8,763,020 | B2 | 6/2014 | Toebes et al. |

(Continued)

FOREIGN PATENT DOCUMENTS

| CN | 101369248 A | 2/2009 |
| CN | 101635861 A | 1/2010 |

(Continued)

OTHER PUBLICATIONS

Hu, Chunlong, et al., "An effective head pose estimation approach using Lie Algebrized Gaussians based face representation," Dec. 1, 2014, Multimedia tools and applications 73.3 (2014): 1863-1884, 23 pages.
(Continued)

*Primary Examiner* — Terrell S Johnson
(74) *Attorney, Agent, or Firm* — Kowert, Hood, Munyon, Rankin & Goetzel, P.C.

(57) ABSTRACT

In an embodiment, a device may include an attention detection service. The attention detection service may monitor various peripheral devices in the device for indications that a user is paying attention to the device. Various clients may register for notification of attention detection and attention lost (attention no longer detected) events, or may poll the
(Continued)

service for the events. If a user is not paying attention to the device, it may be possible to take various actions to permit reduced energy consumption.

20 Claims, 7 Drawing Sheets

Related U.S. Application Data continuation of application No. 15/787,307, filed on Oct. 18, 2017, now Pat. No. 10,642,335.

(60) Provisional application No. 62/514,831, filed on Jun. 3, 2017.

(51) Int. Cl.
*G06F 1/3234* (2019.01)
*G06F 1/3287* (2019.01)
*G06F 1/3296* (2019.01)

(52) U.S. Cl.
CPC .......... *G06F 1/3287* (2013.01); *G06F 1/3296* (2013.01); *Y02D 10/00* (2018.01)

(56) References Cited

U.S. PATENT DOCUMENTS

| | | | |
|---|---|---|---|
| 9,370,302 | B2 | 6/2016 | Krueger |
| 9,576,126 | B2 | 2/2017 | Boshra et al. |
| 9,600,711 | B2 | 3/2017 | Shreve et al. |
| 9,666,088 | B2 | 5/2017 | Dalal et al. |
| 10,642,335 | B2 | 5/2020 | Biron et al. |
| 11,106,265 | B2 | 8/2021 | Biron et al. |
| 2002/0105575 | A1 | 8/2002 | Hinde |
| 2006/0192775 | A1* | 8/2006 | Nicholson ............... G06F 3/013 345/211 |
| 2007/0061851 | A1 | 3/2007 | Deshpande et al. |
| 2008/0215318 | A1* | 9/2008 | Zhang .................... G10L 17/26 704/231 |
| 2009/0046537 | A1 | 2/2009 | Chen et al. |
| 2010/0035589 | A1 | 2/2010 | Wormald et al. |
| 2012/0308090 | A1 | 12/2012 | Sukegawa |
| 2013/0059561 | A1 | 3/2013 | Leemet et al. |
| 2014/0059365 | A1 | 2/2014 | Heo et al. |
| 2014/0075230 | A1 | 3/2014 | Suggs et al. |
| 2014/0204016 | A1 | 7/2014 | Plowman |
| 2015/0227740 | A1 | 8/2015 | Boshra et al. |
| 2015/0347810 | A1 | 12/2015 | Boshra et al. |
| 2018/0132780 | A1 | 5/2018 | Saar |
| 2020/0002072 | A1 | 1/2020 | Hokanson |

FOREIGN PATENT DOCUMENTS

| | | |
|---|---|---|
| CN | 103562818 A | 2/2014 |
| CN | 103999145 A | 8/2014 |
| CN | 104603716 A | 5/2015 |

OTHER PUBLICATIONS

ISRP and WO, PCT/US2018/015089, filed Jan. 24, 2018, mailed Apr. 5, 2018, 13 pages.
WO of the IPEA, PCT/US2018/015089, mailed Apr. 17, 2019, 5 pages.
IPER, PCT/US2018/015089, EPO, Jun. 28, 2019, 5 pages.
First Office Action, CCPIT, Application No. 201880036703.6, dated Apr. 9, 2020, 8 pages. ENG translation followed by original Chinese.
China National Intellectual Property Administration, Chinese Application for Invention No. 201880036703.6, Second Office Action, dated Oct. 29, 2020, pp. 12 including English translation first followed by original Chinese.

* cited by examiner

ATTENTION DETECTION SERVICE

This application is a continuation of U.S. patent application Ser. No. 16/835,520, filed Mar. 31, 2020, which is a continuation of U.S. patent application Ser. No. 15/787,307, filed Oct. 18, 2017 and now U.S. Pat. No. 10,642,335, which claims benefit of priority to Provisional Patent Application Ser. No. 62/514,831, filed on Jun. 3, 2017. The above applications are incorporated herein by reference in their entirety. To the extent that anything in the above application conflicts with the material expressly set forth herein, the material expressly set forth herein controls.

BACKGROUND

Technical Field

Embodiments described herein are related to attention detection on mobile devices.

Description of the Related Art

Mobile devices have become ubiquitous, and for most mobile device users, access to their mobile device is critical for how they spend their days. Mobile devices can include various "smart phones," which include cell phone capabilities and general processing capabilities to execute various applications, or apps, on the phone. The smart phones generally can have Internet access (e.g., over the cellular network or via wifi). Other mobile devices may include tablet computers, laptop computers, etc.

Typically, mobile devices are designed to operate from a mobile power source such as a battery, instead of or in addition to operating from a fixed power source such as a wall power outlet. The fixed power source generally has essentially infinite energy available, while the mobile power source can have a finite amount of stored energy before replenishment is needed. Accordingly the energy is a scarce resource that is desirable to conserve.

While other types of devices (e.g., devices that are plugged into the wall outlet) may not have as critical a need to conserve energy, such devices may wish to reduce energy usage for other reasons. For example, energy consumption is often correlated with an increase in thermal energy that needs to be removed from the device. Inefficient energy consumption can thus cause higher thermal energy in the system, requiring more cooling to extract the thermal energy.

SUMMARY

In an embodiment, a device may include an attention detection service. The attention detection service may monitor various peripheral devices in the device for indications that a user is paying attention to the device. Various clients may register for notification of attention detection and attention lost (attention no longer detected) events, or may poll the service for the events. If a user is not paying attention to the device, it may be possible to take various actions to permit reduced energy consumption.

BRIEF DESCRIPTION OF THE DRAWINGS

The following detailed description makes reference to the accompanying drawings, which are now briefly described.

Figure 1:
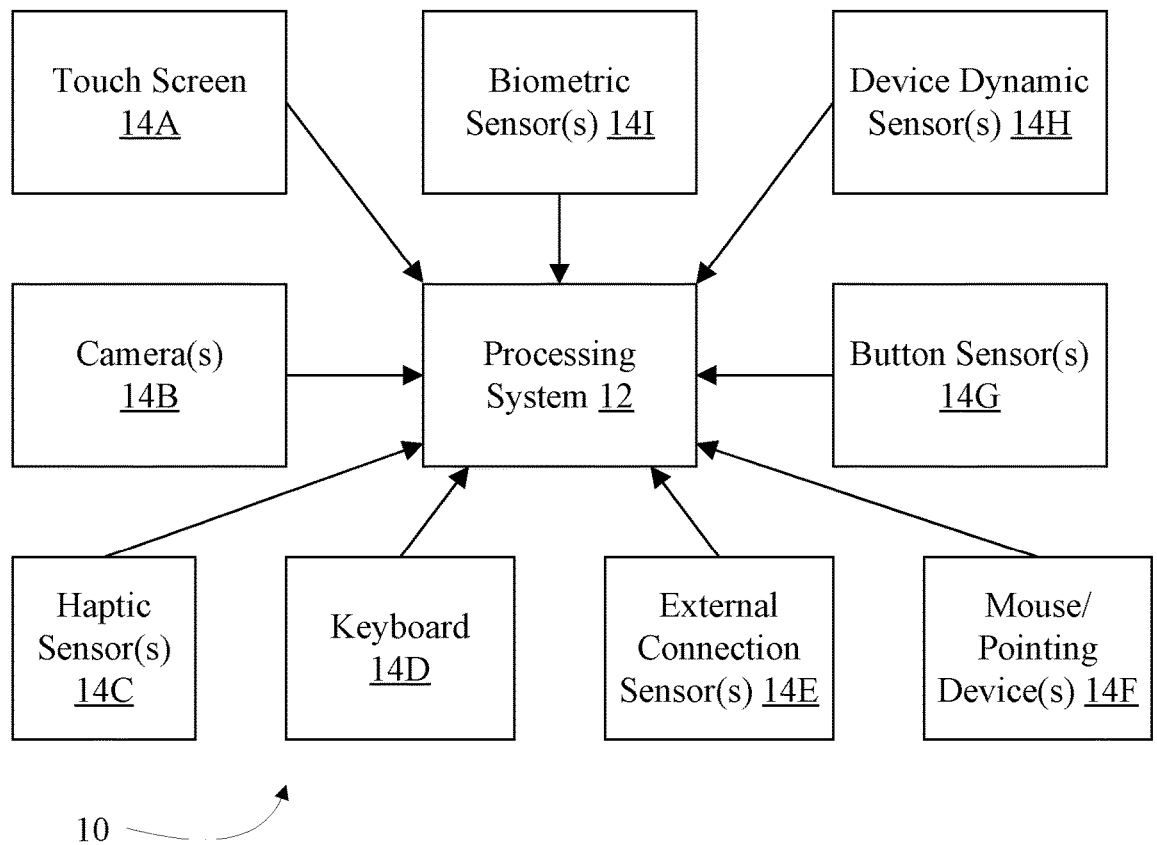
FIG. 1 is a block diagram of one embodiment of a system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out of participation in the collection of personal information data during registration for services.

DETAILED DESCRIPTION OF EMBODIMENTS

Turning now to FIG. 1, a block diagram of one embodiment of a system 10 is shown. In the illustrated embodiment, the system 10 may include a processing system 12 coupled to one or more peripheral devices ("peripherals") 14A-14I. While various peripherals are illustrated as examples in FIG. 1, any set of peripherals may be included in various embodiments, including subsets of the peripherals 14A-14I, subsets of the peripherals 14A-14I and additional peripherals, supersets of the peripherals 14A-14I and additional peripherals, etc. Generally, the system 10 may be any type of digital system. For example, the system 10 may be a portable device such as a personal digital assistant, a smart phone that integrates mobile phone features as well as application execution, a table computer, or a laptop computer. The system 10 may also be a desktop computer, a stand-alone server computer, a rack-mount computer (e.g., server), a workstation, etc.

The processing system 12 may include one or more processors configured to execute instructions defined in an instruction set architecture implemented by the system 10. An instruction set architecture may define the instructions, including their encoding, operands, and operation(s) to be performed in response to executing each instruction. The operands may include data stored in one or more sets of registers implemented in the processor, data stored in memory locations identified by addresses formed from operand data and/or other data, etc. The instruction set architecture may further specify interrupts, exceptions, and other operational factors that are not directly related to instruction execution. The instruction set architecture may define processor state including the above mentioned operand registers as well as various configuration and control registers in which various processor modes may be programmed.

Generally, the processors may have any microarchitecture. For example, the microarchitecture may be scalar or superscalar, speculative or non-speculative, in-order or out-of-order, pipeline or super-pipelined, etc. Various performance-enhancing features such as cache(s), branch prediction, register renaming, central or distributed scheduling, reorder buffers, memory buffers, etc. may be employed in various embodiments. In some embodiments, the processors may employ microcode in addition to any of the above features. Processors may include multi-threading acceleration capabilities, in some embodiments. Processors may be multi-core or single core, and may include integrated processors with other hardware in a system on a chip (SOC) configuration, or may be stand alone multi-core or single-core integrated circuits (ICs). Processors may be implemented in a multi-chip module with other ships. The SOC/IC including the processors may further be included in package-on-package or chip-on-chip configurations with other chips.

In some embodiments, the processing system 12 may include additional circuitry such as a memory controller. The memory controller may interface to a main memory system of the system 10, which may be any type of memory. For example, the memory may be various forms of random access memory (RAM) such as dynamic RAM (DRAM), double data rate DRAM (DDR DRAM) including various mobile DDR (mDDR) and/or low power DDR (LP DDR) DRAMs. The memory may also include various non-volatile RAMs such as Flash memory.

The processing system 12 may further include various other circuitry such as power management circuitry, additional peripherals, peripheral interface circuits for peripheral interfaces (including peripheral interfaces to which one or more of the peripherals 14A-14I are coupled), etc. The processing system 12 may include circuitry that processes data received from one or more of the peripherals 14A-14I (e.g., one or more image signal processors (ISPs) that process images from the camera(s) 14B). In an embodiment, the processing system 12 may be or may include an SOC including the processors and one or more other components including the examples discussed above.

The peripherals 14A-14I may include various peripherals that may provide data indicative of a user of the system 10 paying attention to the system 10. A user may be paying attention to the system 10 if the user is interacting with the system 10 or is engaged with the system 10. The interaction may be visual (e.g., the user is looking at the system 10, and/or looking at a display screen of the system 10), audible (e.g., speaking to a virtual assistant or other speech recognition component on the system, and/or using a predetermined sound as a trigger to indicate attention) and/or the interaction may be physical (e.g., using one or more input/output interfaces to the system 10, and/or moving portable versions of the system 10 in a fashion that indicates usage). As mentioned previously, any set of peripherals may be used in various embodiments.

The touch screen 14A may be a peripheral which detects a user's touch on the surface of the screen. The screen may be a display screen, or may be a touch area on a device such as a laptop where the touch is interpreted as mouse movement (e.g., a touch pad). The screen may also be a touch function row on a keyboard. The touch sensing may include sensing direct contact with the touch screen 14A, or may also include near-touch sensing (e.g., the user's contact, e.g., finger, is within a defined distance from the touch screen 14A) in some embodiments. In addition to detecting the presence or absence of touch, the touch sensing may further include distinguishing between various contact intensities on the touch screen 14A. That is, the touch screen 14A may include haptic sensing, in some embodiments, similar to the haptic sensor(s) 14C discussed in more detail below.

The system 10 may include one or more camera(s) 14B. The camera(s) 14B may capture any sort of image of the environment in front of the camera(s) 14B. For example, the camera(s) 14B may include one or more visible light cameras such as charge coupled device (CCD) cameras, optical cameras, etc. which capture images in the visible light spectrum. The camera(s) 14B may further include one or more infrared (IR) cameras, which capture images in the IR spectrum, in some embodiments. IR images may be used in face detection, for example. The IR cameras may further include structured light cameras which project dots on the face of the user, used for depth detection.

The haptic sensor(s) 14C may also be a type of touch sensor, which senses contact intensity. For example, the haptic sensor(s) 14C may be used on one or more buttons on the system 10 that may be depressed by the user, and the sensed contact intensity may be used to trigger different events within the system 10 (e.g., a first contact intensity on the button may trigger one event, and a second, different contact intensity may trigger another event). In an embodiment, the haptic sensor(s) 14C may include force sensors. Alternatively, in another embodiment, the haptic sensor(s) 14C may include pressure sensors.

The keyboard 14D may be a physical keyboard on which the user types. For example the keyboard 14D may be an integrated keyboard in a laptop, or a keyboard connected to an input/output port of the system 10 such as a universal serial bus (USB) port, a serial port, etc. if the system 10 is a laptop, desktop, server, etc. A keyboard 14D may also wirelessly connect to the system 10 over bluetooth or other wireless interconnects. Some devices may support virtual keyboards displayed on a portion (or all) of the touch screen 14A (e.g., PDAs, smart phones, and tablet computers) and thus the keyboard 14D may not be included on those devices (or may be included via connection to a port, if desired).

The external connection sensor(s) 14E may detect that a device external to the system 10 has been connected to a port or external interface of the system 10. For example, if an external display is connected to a video port (e.g., a video graphics adapter (VGA) or high definition media interface (HDMI) port), the connection may be sensed.

The mouse/pointing device(s) 14F may be any sort of input device that provides for movement of a cursor or other visual indication on a screen. Thus, the mouse/pointing device(s) 14F may include mice, track ball devices, touch tablets, etc. The touch screen 14A may also be a pointing device, in some embodiments. The mouse/pointing device 14F may be connected to the system 10 using various wired or wireless connections, similar to the discussion of the keyboard 14D above.

The button sensor(s) 14G may sense user presses on buttons on the system 10. For example, the button sensor(s) 14G on a smart phone or tablet may detect the power on/off button, volume control buttons, mute switch/button, etc. The button sensors 14G may be used for buttons that do not have haptic sensing via the haptic sensors 14G, in an embodiment.

The device dynamic sensor(s) 14H may be various sensors which detect dynamics of the system 10 within its environment. For example, the device dynamic sensor(s) 14H may include one or more of any of the following: a gyroscope, an accelerometer, a magnetometer, a photodetector, a proximity sensor, a temperature sensor, etc. The device dynamic sensor(s) 14H may be used to detect the orientation and/or movement of the system 10 in the environment surrounding the system 10. The device dynamic sensor(s) 14H may also be used to detect attributes of the environment (e.g., temperature, light, etc.).

The biometric sensor(s) 14I may detect biometric data from a user (e.g., a fingerprint, an iris scan, etc.). The biometric data may be sufficiently diverse in the population that the biometric data may be highly reliable in identifying the user. In an embodiment, face detection via the camera(s) 14B may be a form of biometric sensing as well.

As mentioned above, the various peripherals 14A-14I may be used, in some embodiments, to detect whether or not the user is paying attention to the system 10. If the user is touching the screen (touch screen 14A), the user may be physically interacting with the system 10 and thus paying attention. In some cases, the touch screen 14A may report touches which do not come from the user (e.g., when a system 10 is in a user's pocket, the pocket can cause touch events to occur). Thus, in some embodiments, the data from the touch screen 14A may be filtered with, or qualified by, data from other sensors. Images captured by the camera(s) 14B and processed by the ISP in the processing system 12 may be used to detect a face and, based on the face and in particular the position of the eyes, the processing system 12 may determine if the user is looking at the system 10. If the user is looking at the system 10, the user may be paying attention to the system 10. If the haptic sensor(s) 14C detect sufficient contact intensity, the user may be interacting with the system 10 and thus may be paying attention. Similarly, if the keyboard 14D, the mouse/pointing device(s) 14F, the button sensor(s) 14H and/or the biometric sensor(s) 14I detect user input, the user may be paying attention. If the external connection sensor(s) 14E detect that an external monitor is connected and is displaying output from the system 10, the user may be paying attention to the monitor and thus to the system 10. If the device dynamic sensor(s) 14H detect movement and/or orientation that suggests the user is manipulating the system 10, the user may be paying attention to the system 10.

Combinations of the data from the above peripherals 14A-14I may be used to detect attention and/or to filter data from a peripheral 14A-14I with one or more other peripherals 14A-14I. Additionally, in some embodiments, one or more of the peripherals 14A-14I may be more "expensive" to operate. For example, one or more of the peripherals 14A-14I may consume significantly more power than other peripherals 14A-14I. On a mobile device operating from a mobile power source (e.g., a battery), the expense of the higher power consumption may be a reduction in battery life prior to needing a recharge, for example. Less expensive peripherals 14A-14I may be used as proxies for detecting attention, and when such peripherals 14A-14I do not detect attention for some period of time, the more expensive peripherals 14A-14I may be used to verify that the user is not paying attention.

Various sensors have been described herein as contact intensity sensors, force sensors, pressure sensors, or touch sensors (e.g., the haptic sensors 14C and/or the touch screen or other touch device 14A). Contact intensity sensors may include, for example, one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) receive contact intensity information (e.g., force information, pressure information, or a proxy for force or pressure information) from the environment. In some embodiments, at least one contact intensity sensor is collocated with, or proximate to, a touch-sensitive surface (e.g., the touch screen/device 14A). In some embodiments, at least one contact intensity sensor is located on the back of a device, opposite touch-screen/device 14A which is located on the front of the device. Force sensors and pressure sensors may be examples of contact intensity sensors.

As used herein, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact may have a range of values that includes at least four distinct values and more typically includes hundreds of distinct values (e.g., at least 256). Intensity of a contact may be determined (or measured) using various approaches and various sensors or combinations of sensors. For example, one or more force sensors underneath or adjacent to the touch-sensitive surface may measure force at various points on the touch-sensitive surface. In some implementations, force measurements from multiple force sensors are combined (e.g., a weighted average or a sum) to determine an estimated force of a contact. Similarly, a pressure-sensitive tip of a stylus may determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto may be used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure or a force threshold measured in units of force). Using the intensity of a contact as an attribute of a user input allows for user access to additional device functionality that will, in some circumstances, otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

Figure 2:
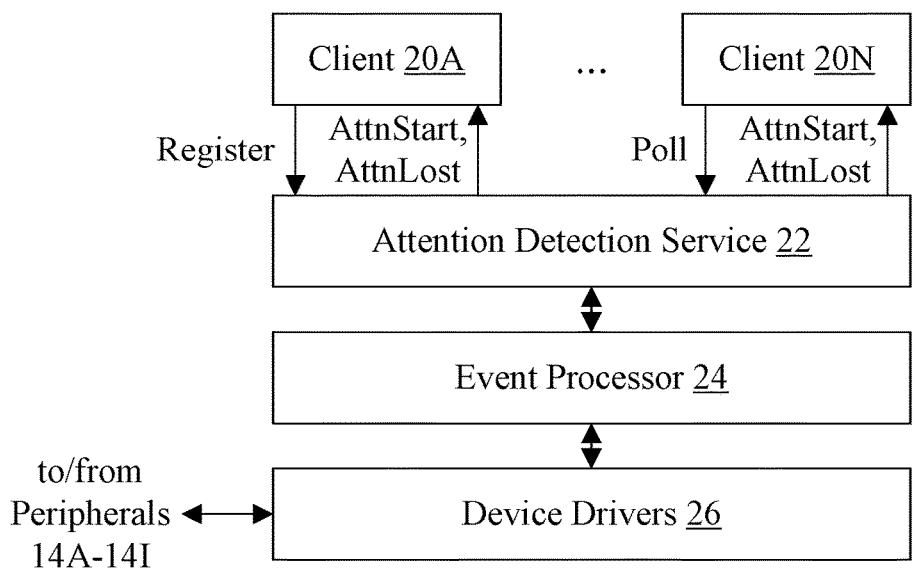
FIG. 2 is a block diagram of one embodiment of software components that may be executed on the system shown in FIG. 1.

FIG. 2 is a block diagram of one embodiment of software components that may be executed in the processing system 12, in an embodiment. In the illustrated embodiment, there may be one or more clients 20A-20N, an attention detection service 22, an event processor 24, and one or more device drivers 26.

The clients 20A-20N may be software code sequences (e.g., processes, threads, or application programs) which may modify their behavior based on whether or not the user is paying attention to the system 10. For example, a client 20A-20N that is responsible for driving frames to the display may determine if the user is paying attention and, if not, may dim the display to save power and/or wear and tear on the display. If the user's lack of attention continues, the client 20A-20N may turn off the display. In another example, the client 20A-20N may drive the ring tone on a smart phone when a call is coming in. If the user is paying attention to the device, the client 20A-20N may reduce the volume of the ring tone (or perhaps even mute the ring tone) so that the user is not overwhelmed with the sound while deciding whether or not to take the call. In another example, a client 20A-20N may be a speech recognition interface to the system 10. If the user speaks a certain key phrase, the speech recognition interface may wake up and begin interpreting the user's speech as commands/requests for the system 10. If the user is paying attention to the system 10, the speech recognition interface may wake up and may display a notification that the speech recognition interface is ready to accept commands. The user may skip the key phrase and begin with the requests/commands. As yet another example, a client 20A-20N that power manages the system 10 may determine if the user is not paying attention to the system 10 and may reduce the performance level of one or more components of the system 10 to reduce power consumption. For example, the processors in the processing system 12 may have their performance states reduced, permitting a lower voltage and frequency of operation. Or, the power manager may cause a graphics adapter to switch screen resolutions to a lower resolution (or may switch to a lower power, lower performance adapter).

In one embodiment, the attention detection service 22 may provide an application programming interface (API) to the clients 20A-20N to permit the clients 20A-20N to detect user attention. The attention detection service 22 may support polling clients and timeout clients.

A polling client may transmit a request to the attention detection service 22 to determine if the user is paying attention at the current time. The current time may be the time at which the poll request is transmitted to the attention detection service 22. In an embodiment, the polling client may also provide a poll duration indicating how long after the current time the polling client is to be informed of changes in the user's attention. In one embodiment, the polling client may provide a staleness tolerance indicating whether or not a recent attention sample would be acceptable for responding to the poll indicating attention at the current time, and the maximum age of the recent attention sample. In the examples above, the ring tone driver may be a polling client that polls when a call is received. The poll duration may be the amount of time that the ring tone driver would transmit the ring tone before transferring to voicemail. In an embodiment, a polling client may optionally specify an attention timeout length as discussed below, but may be actively polling for a portion of the attention timeout interval. For example, a polling client may specify a 1 minute attention timeout length, but may specify active polling for the last 30 seconds of the interval. Events from event-driven sensors (e.g., touch sensors, user input/output sensors like the keyboard or buttons presses, etc.) that are detected during the attention timeout interval may cause the timeout interval to be reset, as discussed below. Passive sensors (which are activated and polled for state, such as the cameras 14B) may be polled in the active polling interval and, if an event is detected from the passive sensors, the active polling interval may be reset.

A timeout client may register with the attention detection service 22, and may specify a maximum sample length and an attention timeout length. The maximum sample length may specify the maximum amount of time that is acceptable without detecting whether or not the user is paying attention to the system 10. The various low power peripherals 14A-14I may provide samples which may be interpreted for attention or inattention. If the samples are received, the sample timeouts may be reset to the maximum sample length. If samples are not received and the sample timeout expires, the high-power peripheral(s) 14A-14I may be used to detect attention. In the present embodiment, for example, the cameras 14B and the ISP within the processing system 12 may be a high power peripheral. If the sample timeout expires, the camera(s) 14B may and the ISP may be activated and may attempt to detect a user's face, as well as which direction the user is looking. If the user appears to be looking at the display of the system 10, then the user may be deemed to be paying attention to the system 10. If the user does not appear in the camera, or the user appears to be looking away from the system 10, then the user may be deemed to not be paying attention. If the user is paying attention, the sample timeouts may be reinitialized to the maximum sample length. If the user is not paying attention, and the attention timeout has expired for one or more clients, the clients may be informed that the user's attention has been lost. In the examples above, the speech recognition interface and the display driver may be timeout clients.

In FIG. 2, the client 20A may be a timeout client and the client 20N may be a polling client. Thus, the client 20A may register with the attention detection service 22 and may receive attention start (AttnStart) and attention lost (AttnLost) indications from the attention detection service 22. The AttnStart indication may be transmitted whenever detected by the attention detection service 22. The AttnLost indication may be transmitted when detected due to attention timeouts. The client 20N may transmit a poll request when a determination of whether or not the user is paying attention is desired. The attention detection service 22 may return AttnStart in response to the poll request if the user is currently paying attention to the system 10. Otherwise, the attention detection service 22 may return AttnStart if attention is detected during the poll duration. If attention is lost after AttnStart is transmitted and it is still within the poll duration, the attention detection service may return AttnLost. Any combination of timeout clients and polling clients may be supported. In an embodiment, a polling client may optionally request an initial attention state when initiating a polling interval. In such a case, the attention detection service 22 may scan for face presence (via the cameras 14B) in response to the polling client's request and respond with an AttnStart if the face is present or return an indication that the polling duration has been initiated if no face is currently present. Scanning for the face may stop if the AttnStart is detected.

In one embodiment, the register and poll calls to the attention detection service 22 may be APIs to the attention detection service 22, and the attention detection service 22 may return AttnStart and AttnLost via callbacks to the clients 20A-20N.

The event processor 24 may receive various events from the device drivers 26, which may control the peripherals 14A-14I. The events may include events that may indicate that the user is paying attention to the system 10. The event processor 24 may transmit these events to the attention detection service 22. The event processor 24 may also process other events and communicate various events, including one or more of the events provided to the attention detection service 22, to other services. In an embodiment, if the attention detection service 22 detects that a user is not paying attention while the attention detection service 22 is scanning for a face (via another peripheral or peripherals besides the camera 14B), the attention detection service 22 may stop scanning for a face. A subsequent interaction by the user with the system 10 may cause the AttnStart event or may cause the attention detection service 22 to begin scanning for a face using the camera 14B.

Figure 3:
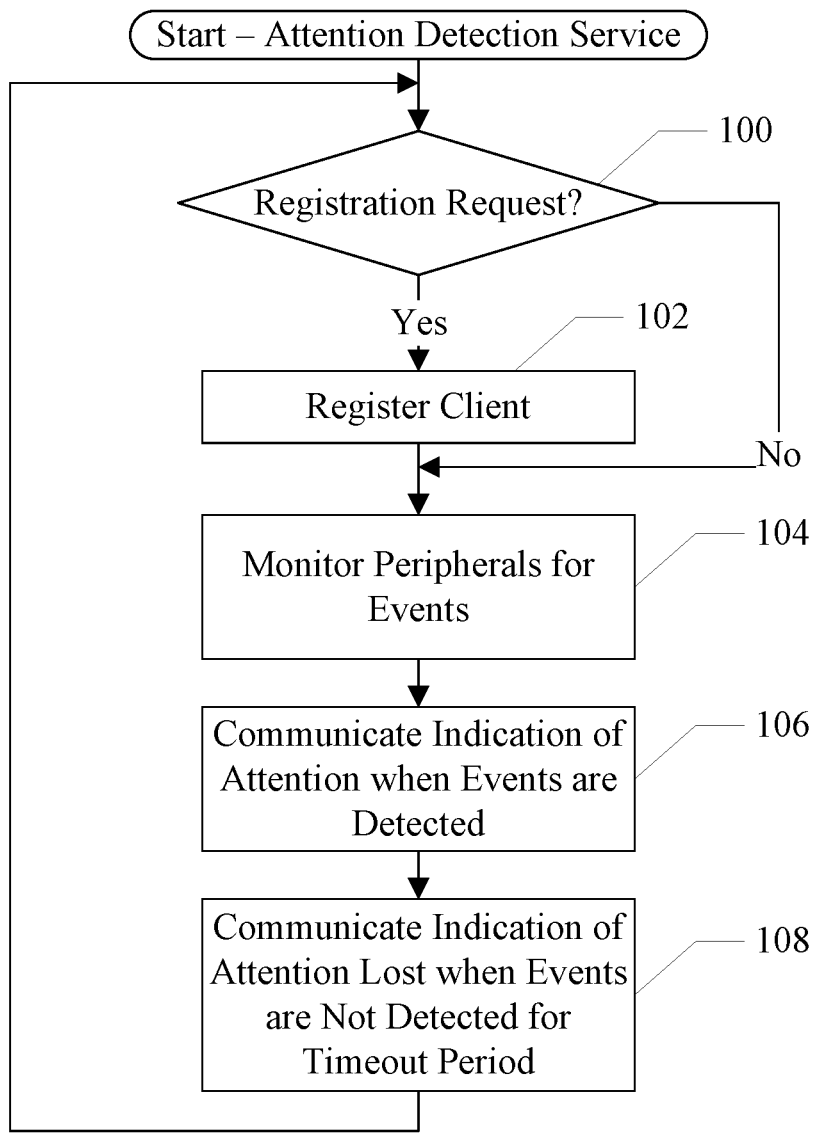
FIG. 3 is a flowchart illustrating operation of one embodiment of an attention detection service shown in FIG. 2.

Turning now to FIG. 3, a flowchart is shown illustrating general operation of one embodiment of the attention detection service 22. While the blocks are shown in a particular order for ease of understanding, other orders may be used. The attention detection service 22 may include instructions which, when executed in the system 10 (and more particularly by the processing system 12, in an embodiment) may implement the operation shown in FIG. 3. Thus, when stored in memory and executed, the attention detection service 22 may be configured to implement the operation shown in FIG. 3.

The attention detection service 22 may detect a registration request and may register the client which sent the registration request (decision block 100, "yes" leg and block 102). Generally, registering a client may include capturing a client identifier or other mechanism to communicate with the client (e.g., a callback address or addresses), a set of events which the client is interested in (e.g., events which the client interprets as being indicative of a user's attention), and potentially other parameters such as attention lost timeouts, sample length timeouts, poll durations for polling clients, etc. The attention detection service 22 may monitor the peripherals 14A-14I for events (block 104); communicate an indication of attention when events are detected to clients who have registered interest in those events (block 106); and communicate an indication of attention lost when timeouts occur without detecting any events within the timeout period (block 108).

While FIG. 3 illustrates the attention detection service 22 as executing in a loop, the execution may actually be thread based and threads may be executed when triggered. For example, registration may be triggered in response to a registration request, monitoring peripherals may be triggered in response to an event or a sample timeout, and communications of attention and attention lost may be triggered by events and timeouts.

Figure 4:
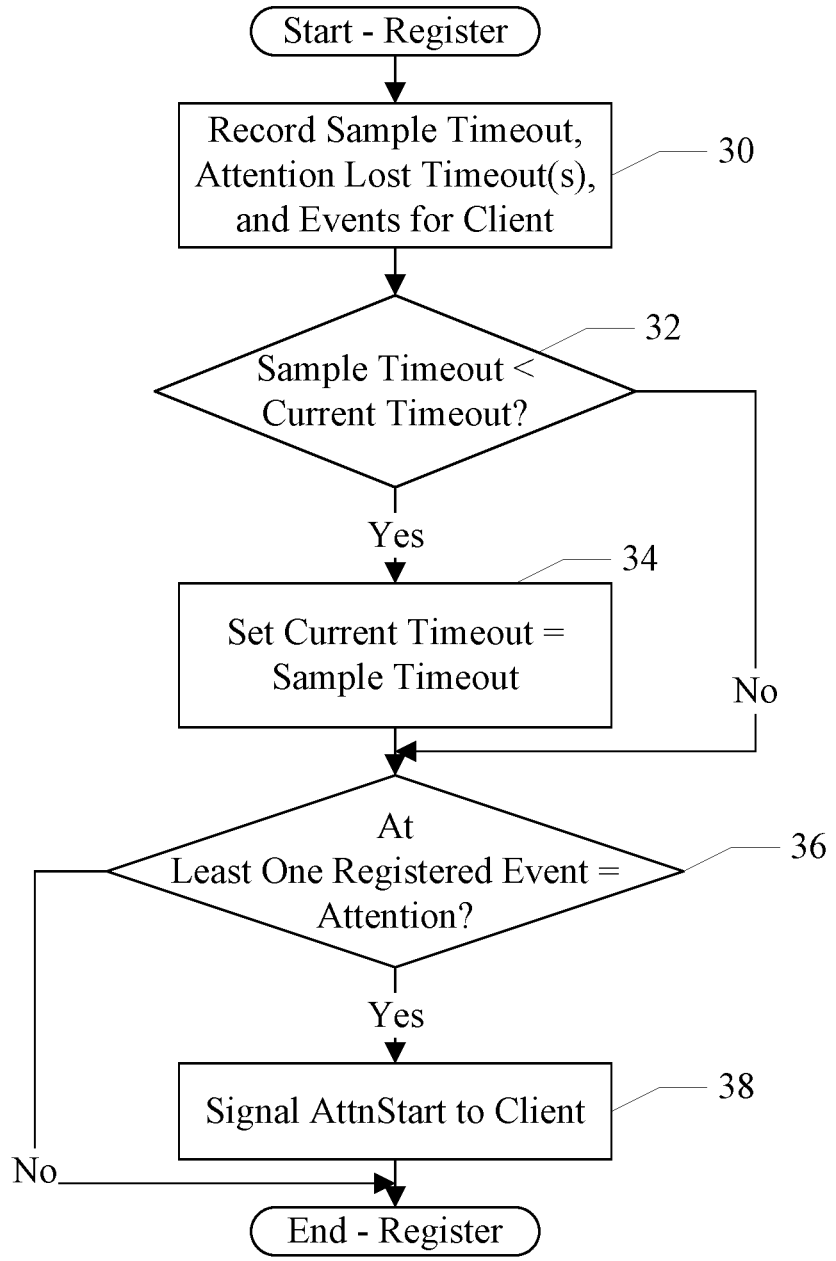
FIG. 4 is a flowchart illustrating operation of one embodiment of an attention detection service shown in FIG. 2 in response to a register request from a client.

Turning now to FIG. 4, a flowchart is shown illustrating operation of one embodiment of the attention detection service 22 in response to a registration request from a timeout client 20A-20N. FIG. 4 may illustrate a portion of block 102 in FIG. 3, in one embodiment. While the blocks are shown in a particular order for ease of understanding, other orders may be used. The attention detection service 22 may include instructions which, when executed in the system 10 (and more particularly by the processing system 12, in an embodiment) may implement the operation shown in FIG. 4. Thus, when stored in memory and executed, the attention detection service 22 may be configured to implement the operation shown in FIG. 4.

The registration request may include a sample length timeout, one or more attention lost timeouts, and a set of events that the client 20A-20N is interested in, and the attention detection service may record the data for the client (block 30). The attention lost timeout(s) may be a set, so that the attention lost event may have multiple levels of timeout. For example, for the screen dim and screen turn off by the display controller, the screen dim may be the first (shortest) timeout in the set and the screen turn off may be a longer timeout. The attention lost timeout may be expressed as a set so the number of timeouts may be specified by each client. That is, each client 20A-20N may determine how many attention timeouts it is to have, independent of the other clients 20A-20N. The set of events are drawn from the events that the attention detection service 22 supports as being indicative of attention to the system. The client 20A-20N may select all of the events or any subset, as desired. For example, the events may be specified as a bit mask, with each bit corresponding to one of the events. The bit may be set to include the event in the events for the client 20A-20N, or may be clear to exclude the event. Other embodiments may use the opposite coding or any other coding, as desired. The events may include touch on the touch screen 14A, face detection through the camera(s) 14B (and the ISP), touch on the haptic sensor(s) 14C (and contact intensities), keyboard activity on the keyboard 14D, external connection sensed by the external connection sensors 14E, mouse/pointing device activity on the mouse/pointing devices 14F, button presses on the button sensors 14G, data from the device dynamic sensors 14H, and activity on the biometric sensors 14I.

The attention detection service 22 may maintain a current timeout as the minimum of the sample length timeouts from the various timeout clients 20A-20N. If the sample length timeout specified by this request is less than the current timeout, (decision block 32, "yes" leg), the attention detection service 22 may update the current timeout to be equal to the sample length timeout specified by the registration request (block 34). If the current sample corresponding to at least one registered event indicates attention by the user (decision block 36, "yes" leg), the attention detection service 22 may transmit an AttnStart to the registering client (block 38).

Figure 5:
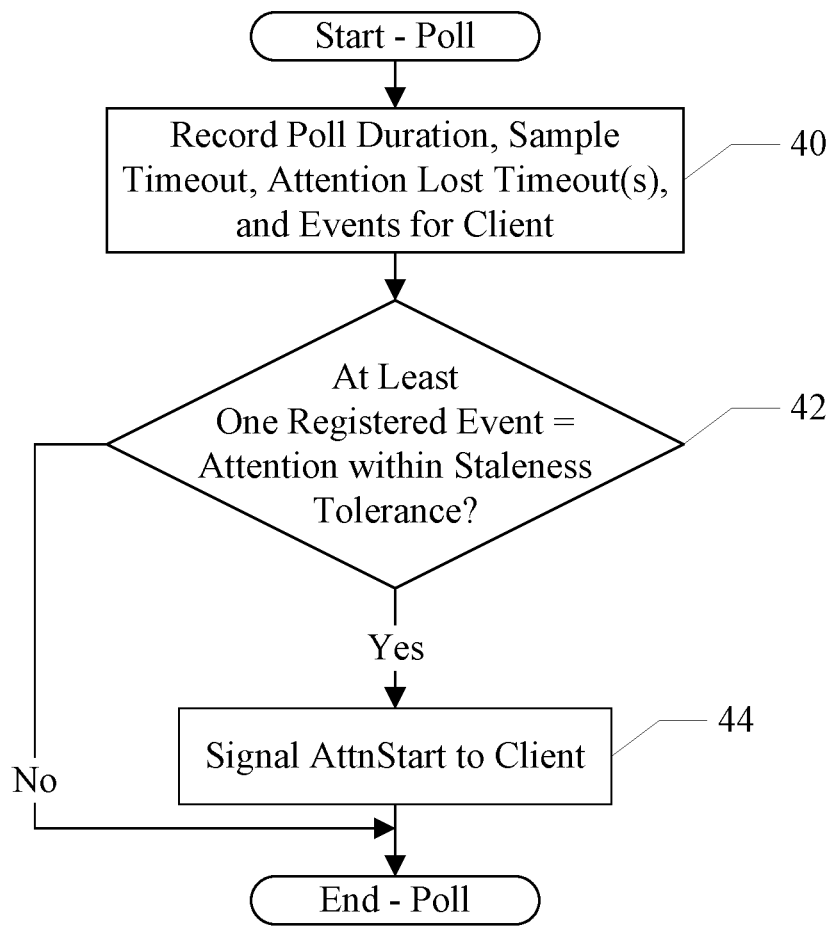
FIG. 5 is a flowchart illustrating operation of one embodiment of the attention detection service shown in FIG. 2 in response to a poll from a client.

Turning now to FIG. 5, a flowchart is shown illustrating operation of one embodiment of the attention detection service 22 in response to a poll request from a polling client 20A-20N. FIG. 5 may illustrate a portion of block 102 in FIG. 3, in an embodiment. While the blocks are shown in a particular order for ease of understanding, other orders may be used. The attention detection service 22 may include instructions which, when executed in the system 10 (and more particularly by the processing system 12, in an embodiment) may implement the operation shown in FIG. 5. Thus, when stored in memory and executed, the attention detection service 22 may be configured to implement the operation shown in FIG. 5.

The poll request may include a poll duration and a set of events which the polling client is interested in (e.g., an event mask, as mentioned above). Additionally, in some embodiments, the poll request may include a sample length timeout and one or more attention lost timeouts. The attention detection service 22 may record the poll duration, sample length timeout, attention lost timeouts, and the set of events for the polling client (block 40). Additionally, the attention detection service 22 may update the current timeout if the sample length timeout in the polling request is shorter than the current timeout. That is, block 40 may be similar to blocks 30, 32, and 34 in FIG. 4. If the polling client permits a staleness tolerance, the attention detection service 22 may determine if a most recent event of one or more of the events for which the polling client has registered (in its event mask) have occurred within the staleness tolerance of the current time (decision block 42). For example, if staleness is not permitted, the staleness tolerance may be zero. If the staleness tolerance is non-zero, the staleness tolerance may be subtracted from the current time to compare to timestamps on the most recent events. If at least one event has occurred within the staleness tolerance (decision block 42, "yes" leg), the attention detection service 22 may transmit an AttnStart to the polling client (block 44). As mentioned above, in some embodiments, the poll request may include a request for an initial state. If so, the attention detection service 22 may initiate scanning for a face via the camera 14B if an AttnStart is not already detected, and may return an indication that scanning has started.

While the flowchart shown in FIG. 5 shows no communication to the polling client if the user is not currently paying attention to the system (decision block 42, "no" leg), other embodiments may communicate the AttnLost message to expressly indicate that the user is not paying attention. Still other embodiments may define a third message to indicate a lack of current attention.

Figure 6:
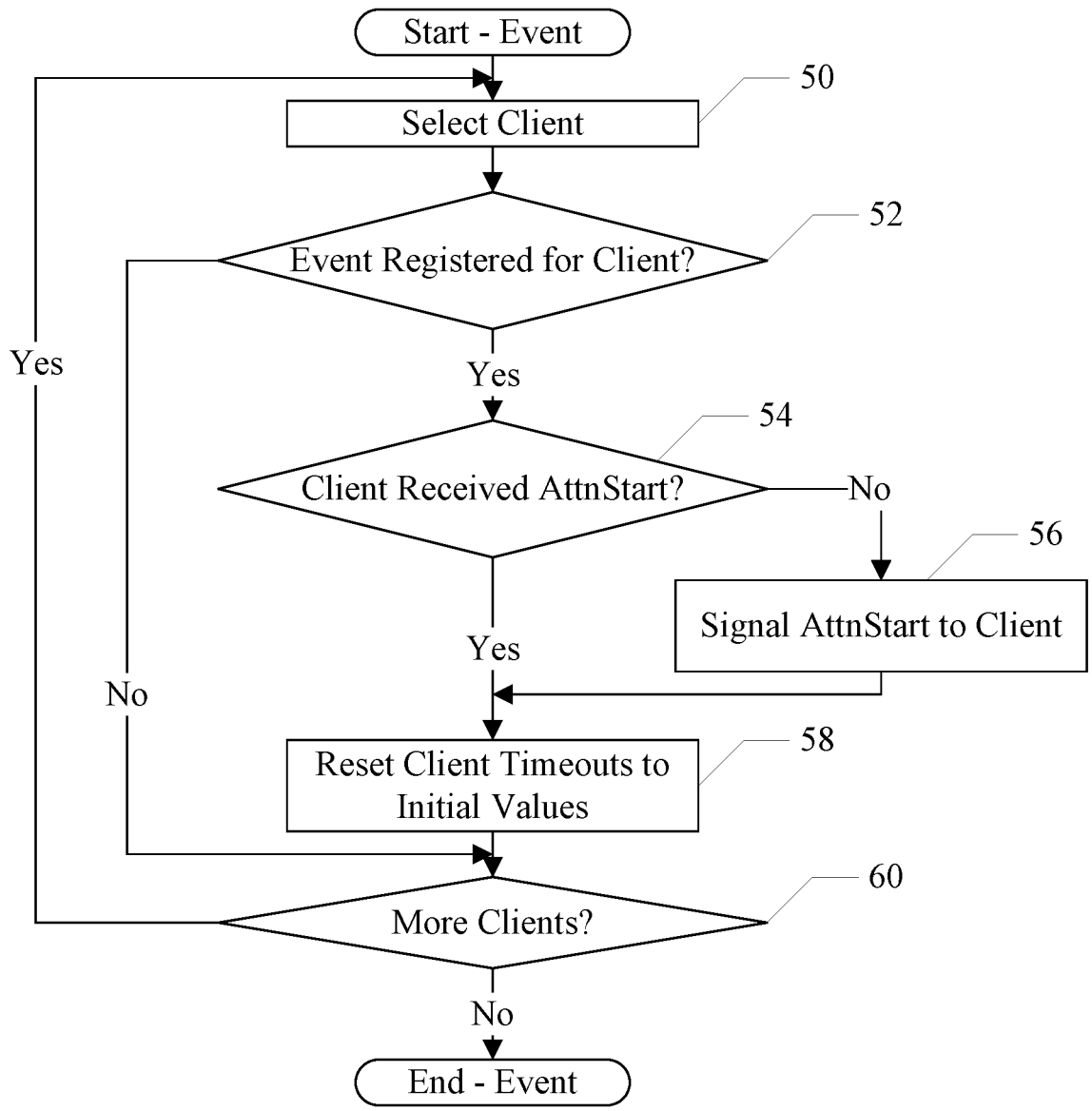
FIG. 6 is a flowchart illustrating operation of one embodiment of the attention detection service shown in FIG. 2 in response to an attention event.

FIG. 6 is a flowchart illustrating operation of one embodiment of the attention detection service 22 in response to an event signaled by the event processor 24. FIG. 6 may be an example of an embodiment of a portion of blocks 104 and 106, in an embodiment. While the blocks are shown in a particular order for ease of understanding, other orders may be used. The attention detection service 22 may include instructions which, when executed in the system 10 (and more particularly by the processing system 12, in an embodiment) may implement the operation shown in FIG. 6. Thus, when stored in memory and executed, the attention detection service 22 may be configured to implement the operation shown in FIG. 6.

The attention detection service 22 may select a client from the active clients (block 50). The active clients may include timeout clients that have registered with the attention detection service 22 or polling clients that have an active poll duration pending. If the selected client is interested in the event, the event may have been registered for the selected client. If so (decision block 52, "yes" leg), and client has not yet received an AttnStart message since the most recent AttnLost message or since the client registered, if the client has never received an AttnStart (decision block 54, "no" leg), the attention detection service 22 may signal AttnStart to the selected client (block 66). Additionally, if the event is registered for the selected client (decision block 52, "yes" leg and decision block 54, either path), the attention detection service 22 may reset the timeouts (sample length and one or more attention lost timeouts) for the client to their initial values, since an event that the client is registered for has been received (block 58).

In the case that the event is not registered for the client (decision block 52, "no" leg), there is no signaling to the client and the client's timeouts are not reset. If there are more active clients to process (decision block 60, "yes" leg), the process represented by blocks 50, 52, 54, 56, and 58 may be repeated.

It is noted that the illustration in FIG. 6 is merely one mechanism for processing an event, and may merely be illustrative of the action taken with respect to a given client. There may be many other implementations. For example, the client data may be arranged by event. When a given event arrives, the affected clients may be looked up according to the given event and may have their timeouts reset and their AttnStart messages sent. Thus, it may not be an iterative process to update the clients as illustrated in FIG. 6. Additionally, the transmission of the AttnStart messages may be delayed until the processing is complete for each client, since the messages are callbacks to the clients and may cause an exit from the attention detection service 22 for a period of time if one of the clients is scheduled to the processor that is executing the attention detection service 22.

Figure 7:
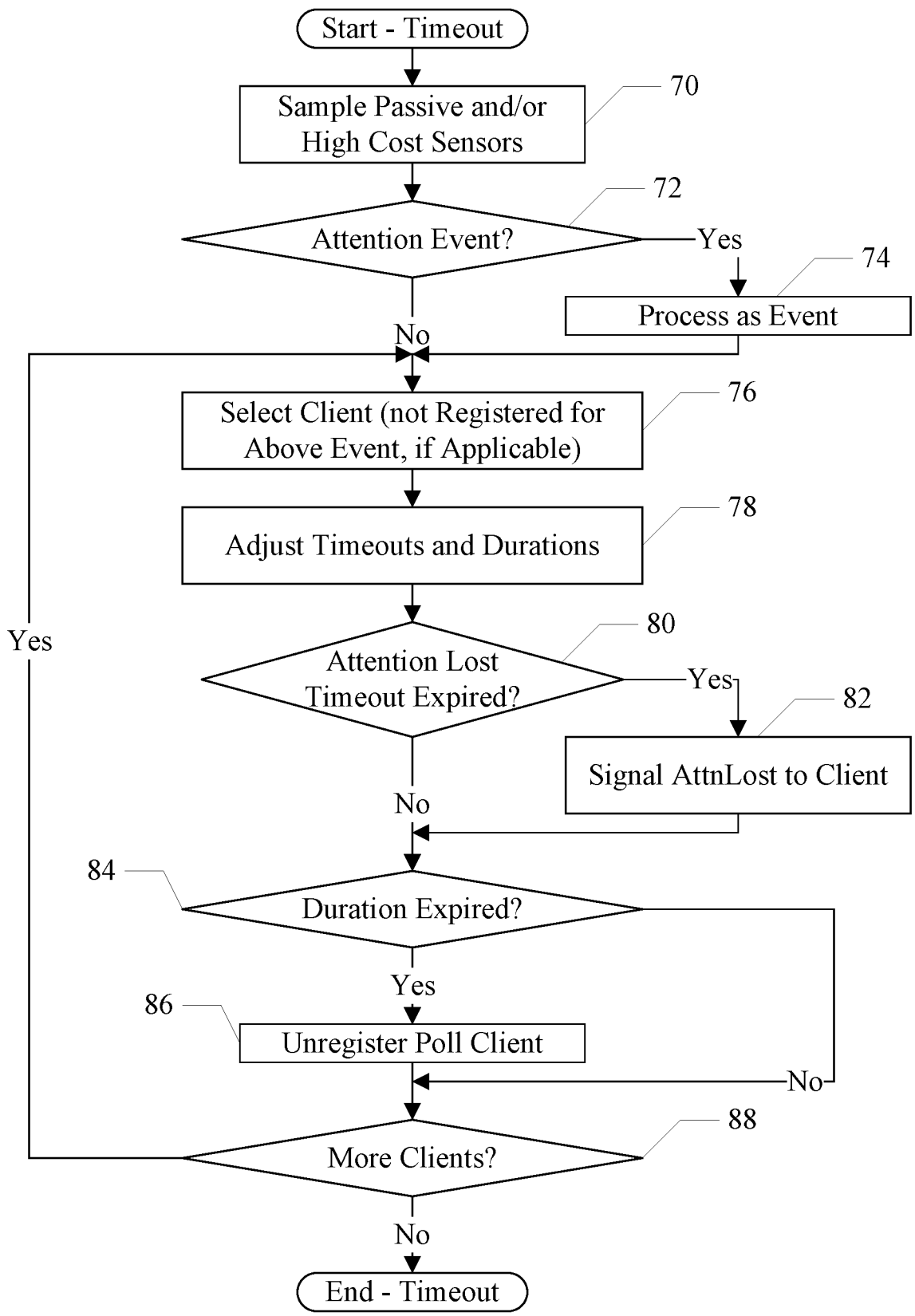
FIG. 7 is a flowchart illustrating operation of one embodiment of the attention detection service shown in FIG. 2 in response to a timeout.

FIG. 7 is a flowchart illustrating operation of one embodiment of the attention detection service 22 in response to expiration of the current timeout maintained by the attention detection service 22. FIG. 7 may be an example of an embodiment of a portion of blocks 104, 106, and 108, in an embodiment. While the blocks are shown in a particular order for ease of understanding, other orders may be used. The attention detection service 22 may include instructions which, when executed in the system 10 (and more particularly by the processing system 12, in an embodiment) may implement the operation shown in FIG. 7. Thus, when stored in memory and executed, the attention detection service 22 may be configured to implement the operation shown in FIG. 7.

The attention detection service 22 may sample any high cost sensors and/or passive sensors, if any (block 70). High cost sensors may be sensors that are not turned on continuously due to their cost (e.g., energy cost). For example, the face detection by the camera(s) 14B may be a high cost sensor. Passive sensors may be sensors that may gather data related to attention, but which do not signal events on their own. Such sensors may be read by the attention detection service 22 at expiration of the current timeout. If the high cost and/or passive sensors indicate an attention event (decision block 72, "yes" leg), the event may be processed as an event (e.g., in the manner of FIG. 6) (block 74).

The attention detection service 22 may select an active client (block 76). In the case of an event detection as illustrated by the block 72, the active clients that are not registered for the detected event are selected, since the other clients have been processed with respect to the detected event. The attention detection service 22 may adjust the timeouts and/or durations associated with the selected client (block 78). For example, the timeouts may be adjusted by subtracting the current timeout, saturating at zero. Alternatively, a timeout originally started at zero may have the current timeout added, saturating at the timeout specified by the client. If one of the attention lost timeouts associated with the client has expired (decision block 80, "yes" leg), the attention detection service 22 may signal AttnLost to the client (block 82). Additionally, if the client is a polling client and the duration has expired (decision block 84, "yes" leg), the attention detection service 22 may unregister the client since the poll is complete (block 86). If there are more clients remaining to be processed (decision block 88, "yes" leg), the process represented by blocks 76, 78, 80, 82, 84, and 86 may be repeated for another client.

Similar to the discussion above for FIG. 6, the illustration in FIG. 7 is merely one mechanism for processing a timeout, and may merely be illustrative of the action taken with respect to a given client. There may be many other implementations. For example, the timeouts/durations for each client that was not processed by the detected event in blocks 72 and 74 (in an embodiment) may be updated as a single operation rather than iterated on a client-by-client basis. The processing represented by blocks 76, 78, 80, 82, 84, and 86 may be performed in parallel for the various clients. Additionally, the transmission of the AttnLost messages may be delayed until the processing is complete for each client, since the messages are callbacks to the clients and may cause an exit from the attention detection service 22 for a period of time if one of the clients is scheduled to the processor that is executing the attention detection service 22.

In an embodiment, access to the attention detection service 22 may be controlled. For example, a client 20A-20N may be required to hold an entitlement to the attention detection service 22 in order to use the APIs in the attention detection service 22. Entitlements may be rights that may be granted to various code sequences based on a level of trust that the system 10 has for the code sequences. For example, clients entitled to access the attention detection service 22 may be clients that are part of the operating system in the system 10, or are produced by the same company that produced the attention detection service 22. In an embodiment, the company may vet certain clients carefully, then grant them entitlement to the attention detection service 22 as well. In an embodiment, there may be multiple levels of entitlement. The most trusted clients may have free access to the attention detection service 22. Less trusted clients may have access with limits (e.g., minimum timeouts may be enforced, frequency at which polling is permitted may be enforced, etc.).

It is noted that, in some embodiments, an event from a given peripheral 14A-14I may be filtered by, or may be used to filter, events from other peripherals 14A-14I. For example, if a touch on the touch screen 14A is detected by the proximity sensor indicates that there is an object in close proximity to the system 10 (e.g., a pocket or a user's head), the touch may be a false touch not indicative of attention. The proximity sensor output may thus be used to filter the touch detection.

Figure 8:
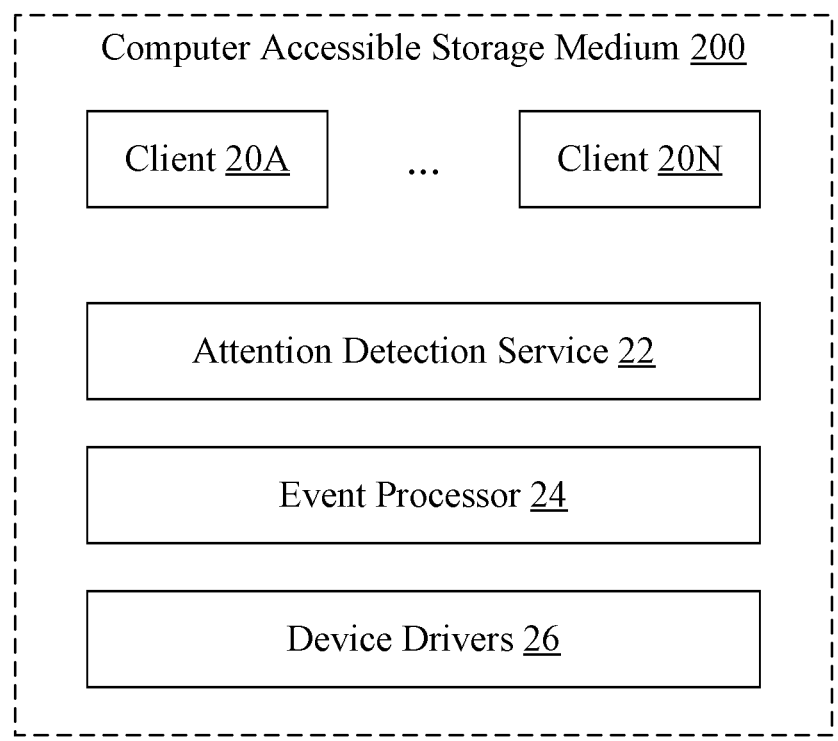
FIG. 8 is a block diagram of one embodiment of a computer-accessible storage medium.

FIG. 8 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 8 may store code forming the clients 20A-20N, the attention detection service 22, the event processor 24, and/or the device drivers 26. The clients 20A-20N, the attention detection service 22, the event processor 24, and/or the device drivers 26 may comprise instructions which, when executed, implement the operation described above for these components. Particularly, the attention detection service 22 may include instructions which, when executed on the system 10, implement the operation of FIGS. 3-7. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
    monitoring a plurality of peripheral devices in a system for a plurality of events, wherein the plurality of peripheral devices include a first one or more peripheral devices and a second one or more peripheral devices, and wherein each of the first one or more peripheral devices consumes more power during use than each of the second one or more peripheral devices, and wherein, during a sample timeout interval, the first one or more peripheral devices are not sampled;
    responsive to a first event of the plurality of events from one of the second one or more peripheral devices, communicating an indication to one or more clients of a plurality of clients executable on the system;
    responsive to an expiration of the sample timeout interval without detecting events from the second one or more peripheral devices, sampling the first one or more peripheral devices;
    detecting a second event from one of the first one or more peripheral devices during the sampling; and
    responsive to detecting the second event, communicating a second indication to the one or more clients.

2. The method as recited in claim 1 wherein the first one or more peripheral devices comprise a camera configured to detect a face of a user.

3. The method as recited in claim 1 wherein the first one or more peripheral devices comprise one or more passive sensors.

4. The method as recited in claim 1 further comprising, responsive to detecting the first event from one of the second one or more peripheral devices, updating a current timeout to a sample length timeout.

5. The method as recited in claim 1 further comprising:
    responsive to not detecting the second event, updating an attention lost timeout;
    detecting expiration of the attention lost timeout associated with a first client of the one or more clients; and
    communicating an indication of the attention lost timeout to the first client responsive to detecting the expiration of the attention lost timeout.

6. The method as recited in claim 1 further comprising:
    receiving a poll request from a second client of the one or more clients, wherein the poll request specifies an indication of current engagement and a poll duration during which potential user engagement is to be reported to the second client;
    detecting that a user is currently engaged with the system responsive to a fourth event in the plurality of events; and
    communicating the indication of the current engagement to the second client responsive to detecting that the user is currently engaged.

7. The method as recited in claim 6 further comprising:
    detecting a third event of the plurality of events during the poll duration, wherein the third event is specified in the poll request as one of the plurality of events that the second client interprets as indicative of engagement; and
    communicating the indication of engagement to the second client responsive to detecting the third event and not having detected that the user was currently engaged with the system at the time the poll request was received.

8. The method as recited in claim 6 further comprising:
    detecting a timeout during a time period subsequent to receiving the poll request without detecting the plurality of events during the poll duration; and
    communicating an indication of engagement lost to the second client responsive to detecting the timeout.

9. The method as recited in claim 6 further comprising:
    detecting that the poll duration has expired; and discontinuing communication of the indication of current engagement and an indication of engagement lost to the second client responsive to detecting that the poll duration has expired.

10. The method as recited in claim 6 wherein the poll request further includes an active polling interval, and the method further comprises polling for the plurality of events during the active polling interval.

11. A non-transitory computer accessible storage medium storing instructions which, when executed on a system:
monitor a plurality of peripheral devices in the system for a plurality of events, wherein the plurality of peripheral devices include a first one or more peripheral devices and a second one or more peripheral devices, and wherein each of the first one or more peripheral devices consumes more power during use than each of the second one or more peripheral devices, and wherein, during a sample timeout interval, the first one or more peripheral devices are not sampled;
responsive to a first event of the plurality of events from one of the second one or more peripheral devices, communicate an indication to one or more clients of a plurality of clients executable on the system;
responsive to an expiration of the sample timeout interval without detecting events from the second one or more peripheral devices, sample the first one or more peripheral devices;
detect a second event in the sample from one of the first one or more peripheral devices; and
responsive to detecting the second event, communicate a second indication to the one or more clients.

12. The non-transitory computer accessible storage medium as recited in claim 11 wherein the instructions, when executed responsive to detecting the first event, update a current timeout to a sample length timeout.

13. The non-transitory computer accessible storage medium as recited in claim 11 wherein the instructions, when executed responsive to not detecting the second event:
update an attention lost timeout;
detect expiration of the attention lost timeout associated with a first client of the one or more clients; and
communicate an indication of lost engagement to the first client.

14. The non-transitory computer accessible storage medium as recited in claim 11 wherein the instructions, when executed:
receive a poll request from a second client of the one or more clients, wherein the poll request specifies an indication of current engagement and a poll duration during which potential user engagement is to be reported to the second client;
detect that a user is currently engaged with the system responsive to a fourth event in the plurality of events; and
communicate the indication of the current engagement to the second client responsive to detecting that the user is currently paying attention.

15. The non-transitory computer accessible storage medium as recited in claim 14 wherein the instructions, when executed:
detect a fifth event of the plurality of events during the poll duration, wherein the fifth event is specified in the poll request as one of the plurality of events that the second client interprets as indicative of engagement; and
communicate the indication of engagement to the second client responsive to detecting the fifth event and not having detected that a user was currently engaged with the system at the time the poll request was received.

16. The non-transitory computer accessible storage medium as recited in claim 14 wherein the instructions, when executed:
detect a timeout during a time period subsequent to receiving the poll request without detecting the plurality of events during the poll duration; and
communicate an indication of engagement lost to the second client responsive to detecting the timeout.

17. The non-transitory computer accessible storage medium as recited in claim 14 wherein the instructions, when executed:
detect that the poll duration has expired; and
discontinue communication of the indication of current engagement and an indication of engagement lost to the second client responsive to detecting that the poll duration has expired.

18. A system comprising:
a plurality of peripheral devices; and
a processing system coupled to the plurality of peripheral devices, wherein the processing system comprises one or more processors coupled to a memory system storing a plurality of instructions, wherein the plurality of instructions, when executed by the one or more processors:
monitor the plurality of peripheral devices for a plurality of events, wherein the plurality of peripheral devices include a first one or more peripheral devices and a second one or more peripheral devices, and wherein each of the first one or more peripheral devices consumes more power during use than each of the second one or more peripheral devices, and wherein, during a sample timeout interval, the first one or more peripheral devices are not sampled;
responsive to a first event of the plurality of events from one of the second one or more peripheral devices, communicate an indication to one or more clients of a plurality of clients executable on the system;
responsive to an expiration of the sample timeout interval without detecting events from the second one or more peripheral devices, sample the first one or more peripheral devices;
detect a second event in the sample from one of the first one or more peripheral devices; and
responsive to detecting the second event, communicate a second indication to the one or more clients.

19. The system as recited in claim 18 wherein the first one or more peripheral devices comprise a camera configured to detect a face of a user.

20. The system as recited in claim 18 wherein the first one or more peripheral devices comprise one or more passive sensors.

* * * * *